(12) United States Patent
Yun et al.

(10) Patent No.: US 10,348,433 B2
(45) Date of Patent: Jul. 9, 2019

(54) METHOD FOR SUPPRESSING INTER-SUBCARRIER INTERFERENCE AND NOISE SIGNAL, AND ORTHOGONAL FREQUENCY DIVISION MULTIPLEXING RECEIVER FOR PERFORMING SAME

(71) Applicant: TELECHIPS INC., Seoul (KR)

(72) Inventors: Young Ho Yun, Gyeonggi-do (KR); Sukhyun Yoon, Seoul (KR)

(73) Assignee: TELECHIPS INC., Seoul (KR)

( * ) Notice: Subject to any disclaimer, the term of this patent is extended or adjusted under 35 U.S.C. 154(b) by 0 days.

(21) Appl. No.: 16/081,968

(22) PCT Filed: Feb. 17, 2017

(86) PCT No.: PCT/KR2017/001776
§ 371 (c)(1),
(2) Date: Sep. 4, 2018

(87) PCT Pub. No.: WO2017/150832
PCT Pub. Date: Sep. 8, 2017

(65) Prior Publication Data
US 2019/0123844 A1    Apr. 25, 2019

(30) Foreign Application Priority Data
Mar. 3, 2016   (KR) .................. 10-2016-0025906

(51) Int. Cl.
*H04J 11/00*    (2006.01)
*H04L 27/26*    (2006.01)
(Continued)

(52) U.S. Cl.
CPC ....... *H04J 11/0056* (2013.01); *H04J 11/0046* (2013.01); *H04J 11/0059* (2013.01);
(Continued)

(58) Field of Classification Search
CPC .................................................. H04B 1/1027
See application file for complete search history.

(56) References Cited

U.S. PATENT DOCUMENTS

| | | | |
|---|---|---|---|
| 6,798,738 B1 * | 9/2004 | Do | H04L 27/2662 348/E7.042 |
| 2008/0112518 A1 * | 5/2008 | Wilhelmsson | H04L 27/2647 375/348 |
| 2009/0059781 A1 | 3/2009 | Tseng et al. | |

FOREIGN PATENT DOCUMENTS

| | | |
|---|---|---|
| KR | 20100039467 A | 4/2010 |
| KR | 100992327 B1 | 11/2010 |

(Continued)

OTHER PUBLICATIONS

Ma, et al., A Simple ICI Suppression Method Utilizing Cyclic Prefix for OFDM Systems in the Presence of Phase Noise, IEEE Transactions on Communications, Nov. 2013, Published Sep. 26, 2013, pp. 4539-4550, vol. 61, No. 11.

*Primary Examiner* — Hsinchun Liao
(74) *Attorney, Agent, or Firm* — Dinsmore & Shohl LLP (57) ABSTRACT

Disclosed is a method for suppressing an inter-carrier interference and noise signal, and an orthogonal frequency division multiplexing receiver for performing the same. Here, a method for an orthogonal frequency division multiplex (OFDM) receiver to suppress an inter-carrier interference and noise signal by using a symbol interference free interval without inter-symbol interference (ISI) in a guard interval (GI) includes: performing a weighting operation between sample data of the symbol interference free interval and sample data of the effective symbol interval by using a signal-to-noise ratio (SNR) of the symbol interference free interval and an SNR of an effective symbol interval corresponding to the symbol interference free interval; and performing a fast Fourier transform (FFT) on FFT input data
(Continued)

configured by including the weighting-operated sample data into the effective symbol interval.

10 Claims, 10 Drawing Sheets (51) Int. Cl.
*H04L 5/00* (2006.01)
*H04L 25/03* (2006.01)
(52) U.S. Cl.
CPC .......... *H04L 5/006* (2013.01); *H04L 27/2646* (2013.01); *H04L 27/2665* (2013.01); *H04L 25/03006* (2013.01)

(56) References Cited

FOREIGN PATENT DOCUMENTS

KR     20120133336 A     12/2012
KR     101239655 B1     3/2013

* cited by examiner

METHOD FOR SUPPRESSING INTER-SUBCARRIER INTERFERENCE AND NOISE SIGNAL, AND ORTHOGONAL FREQUENCY DIVISION MULTIPLEXING RECEIVER FOR PERFORMING SAME

CROSS-REFERENCE TO RELATED APPLICATIONS

This application is the U.S. national stage of PCT/KR2017/001776 filed Feb. 17, 2017, which claims priority of Korean Patent Application No. 10-2016-0025906 filed Mar. 3, 2016.

FIELD OF THE INVENTION

The present disclosure relates to a method for suppressing an inter-carrier interference and noise signal and an orthogonal frequency division multiplex (referred to as OFDM hereinafter) receiver for performing the same. More particularly, the present disclosure relates to a skill for an OFDM receiver to suppress an inter-carrier interference and noise signal.

BACKGROUND OF THE INVENTION

Recently, many studies have been in progress so as to support high-quality and high-speed data transmission in a radio communication environment. Among them, the OFDM uses limited frequencies efficiently to be used for a broadcasting system such as a digital video broadcasting-terrestrial and handheld (DVB-T/H) and a digital multimedia broadcasting (DMB), and it is an influential candidate for fourth-generation communication and next generation broadcasting.

A transmitting end of a communication system using the OFDM scheme modulates serial data symbols, demultiplexes the same into parallel data, and performs an inverse fast Fourier transform (IFFT) on the same. The transmitting end allocates a plurality of subcarriers to the demultiplexed parallel data, and then transmits resultant data to a receiving end. The receiving end performs a fast Fourier transform (referred to as FFT hereinafter) on the received signal to separate a subcarrier from the received signal, multiplexes the parallel data from which the subcarrier is separated into serial data, and demodulates the multiplexed serial data to detect a desired data symbol.

In this instance, FFT output data from the OFDM transmitting end generates inter-carrier interference (referred to as ICI hereinafter) according to a radio channel characteristic. Before the OFDM receiver performs an FFT, it may suppress inter-carrier interference and reduce a noise component by using an area where there is no OFDM inter-symbol interference (referred to as ISI hereinafter).

That is, when the FFT input data for performing an FFT operation is configured, sample data of the guard interval (GI) without ISI in the time domain, that is, the symbol interference free interval and sample data of the effective symbol interval, are summed. An FFT operation on the FFT input data including the summed sample data is performed. Korean Patent Application Publication 2010-0039467 discloses content for reducing ICI and a noise component through an FFT operation.

In this instance, when the sample data of the symbol interference free interval and the sample data of the effective symbol interval are summed and in the case of a Frank window, they may be added by using a ratio of the FFT side vs. the symbol interference free interval.

In the case of another existing case, a method for taking an average by setting respective weight values that correspond to 0.5 can be used. That is, the weight value of 0.5 is respectively provided to the sample data of the symbol interference free interval and the sample data of the effective symbol interval, and the average thereof is calculated. This method is similar to equal gain combining (referred to as EGC hereinafter). Here, the EGC signifies phase-coherent combining of different channels with a substantially equivalent weight value.

However, if the channels are abruptly changed by a mobile environment, a signal-to-noise ratio (referred to as SNR hereinafter) of the symbol interference free interval may be higher or lower than an SNR of the effective symbol interval.

Figure 1:
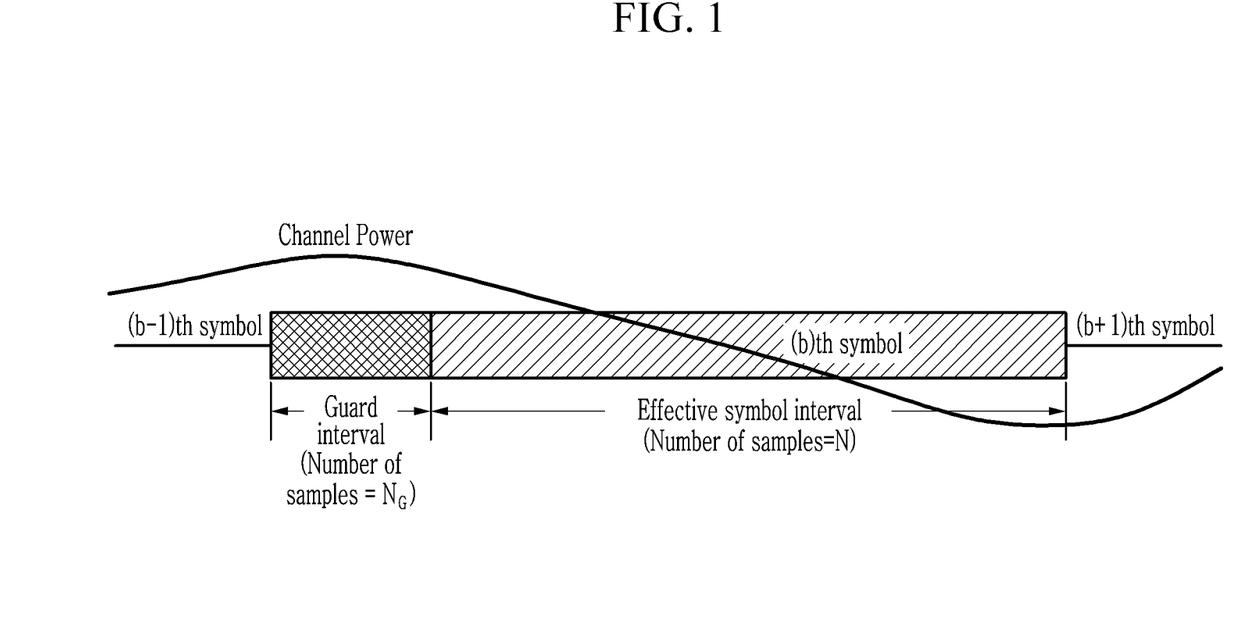
FIG. 1 shows a conventional OFDM symbol.

FIG. 1 shows a conventional OFDM symbol.

Referring to FIG. 1, a change width of channel power of a guard interval and an effective symbol interval is large.

As described, when the channel change is large and a simple summation of the sample data of the symbol interference free interval and the sample data of the effective symbol interval is performed in a like manner of prior art, a problem that the SNR fails to obtain a gain of a large interval is generated.

SUMMARY OF THE INVENTION

The present disclosure has been made in an effort to provide a method for suppressing an inter-carrier interference and noise signal by performing a weighting operation between sample data included in a symbol interference free interval and sample data of an effective symbol interval in a time domain in consideration of a channel change, and an OFDM receiver for performing the same.

An exemplary embodiment of the present disclosure provides a method for an orthogonal frequency division multiplex (OFDM) receiver to suppress an inter-carrier interference and noise signal by using a symbol interference free interval without inter-symbol interference (ISI) in a guard interval (GI), including: performing a weighting operation between sample data of the symbol interference free interval and sample data of the effective symbol interval by using a signal-to-noise ratio (SNR) of the symbol interference free interval and an SNR of an effective symbol interval corresponding to the symbol interference free interval; and performing a fast Fourier transform (FFT) on fast Fourier transform (FFT) input data configured by including the weighting-operated sample data into the effective symbol interval.

The method may further include, before the performing of a weighting operation, measuring or estimating the signal-to-noise ratio (SNR) of the symbol interference free interval and the signal-to-noise ratio (SNR) of the effective symbol interval, respectively, wherein the performing of a weighting operation includes using the measured or estimated signal-to-noise ratio (SNR) of the symbol interference free interval and the measured or estimated signal-to-noise ratio (SNR) of the effective symbol interval.

The measuring or estimating may include estimating the signal-to-noise ratio (SNR) of the symbol interference free interval and the signal-to-noise ratio (SNR) of the effective symbol interval respectively through power of received data in a time domain.

The measuring or estimating may include: performing a fast Fourier transform (FFT) operation corresponding to a length of the guard interval on the sample data of the symbol interference free interval and the sample data of the effective symbol interval; measuring a first power spectrum of a fast Fourier transform (FFT) result on the sample data of the symbol interference free interval and a second power spectrum of a fast Fourier transform (FFT) result on the sample data of the effective symbol interval; and estimating a value generated by performing an adding operation or an averaging operation on the first power spectrum to be a signal-to-noise ratio (SNR) of the symbol interference free interval and a value generated by performing an adding operation or an averaging operation on the second power spectrum to be a signal-to-noise ratio (SNR) of the effective symbol interval for at least one subcarrier of which the first power spectrum and the second power spectrum are equal to or greater than a predetermined threshold value.

The performing of a weighting operation may include performing a weighting operation to which a range setting value with hardware bit precision using the signal-to-noise ratio (SNR) of the symbol interference free interval and the signal-to-noise ratio (SNR) of the effective symbol interval is applied.

Another embodiment of the present disclosure provides an orthogonal frequency division multiplexing receiver including: a weighting operator for performing a weighting operation between sample data of a symbol interference free interval and sample data of an effective symbol interval by using a signal-to-noise ratio (SNR) of the symbol interference free interval without inter-symbol interference (ISI) and a signal-to-noise ratio (SNR) of the effective symbol interval corresponding to the symbol interference free interval in a guard interval (GI) of an orthogonal frequency division multiplex (OFDM) symbol; a fast Fourier transform (FFT) sampling data controller for generating fast Fourier transform (FFT) input data by including weighting-operated sample data into the effective symbol interval; and a fast Fourier transform (FFT) operator for performing a fast Fourier transform (FFT) operation on the fast Fourier transform (FFT) input data.

The weighting operator may perform a weighting operation using a first operation value generated by applying the signal-to-noise ratio (SNR) of the symbol interference free interval as a weight value coefficient to the symbol interference free interval modeled signal, a second operation value generated by applying the signal-to-noise ratio (SNR) of the effective symbol interval as a weight value coefficient to the effective symbol interval modeled signal, and a value generated by summing the signal-to-noise ratio (SNR) of the symbol interference free interval and the signal-to-noise ratio (SNR) of the effective symbol interval.

The weighting operator may calculate a range setting value with hardware bit precision by using the signal-to-noise ratio (SNR) of the symbol interference free interval and the signal-to-noise ratio (SNR) of the effective symbol interval, and may apply the range setting value as a weight value coefficient to the symbol interference free interval modeled signal and the effective symbol interval modeled signal to perform a weighting operation.

The orthogonal frequency division multiplexing receiver may further include: a measurer for measuring a signal-to-noise ratio (SNR) of the symbol interference free interval and a signal-to-noise ratio (SNR) of the effective symbol interval corresponding to the symbol interference free interval; or an estimator for estimating the signal-to-noise ratio (SNR) of the symbol interference free interval and the signal-to-noise ratio (SNR) of the effective symbol interval corresponding to the symbol interference free interval in a time domain or a frequency domain.

The estimator may estimate a value generated by performing an adding operation or averaging operation on the first power spectrum to be a signal-to-noise ratio (SNR) of the symbol interference free interval, and may estimate a value generated by performing an adding operation or averaging operation on the second power spectrum to be a signal-to-noise ratio (SNR) of the effective symbol interval for at least one subcarrier, in which a first power spectrum of a fast Fourier transform (FFT) result on sample data of the symbol interference free interval and a second power spectrum of a fast Fourier transform (FFT) result on sample data of the effective symbol interval is equal to or greater than a threshold value.

According to the exemplary embodiment of the present disclosure, the maximum ratio combining (referred to as MRC hereinafter) diversity effect may be obtained by performing a weighting operation in consideration of the SNR when the FFT input data are generated by using the sample data of the symbol interference free interval and the sample data of the effective symbol interval.

DETAILED DESCRIPTION OF THE PREFERRED EMBODIMENTS

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

The suffixes "-er" and "-or" and the term "module" described in the specification mean units for processing at least one function or operation, and can be implemented by hardware or software and combinations thereof. Like reference numerals shown in the drawings indicate like constituent elements.

A method for suppressing an inter-carrier interference and noise signal and an OFDM receiver for performing the same according to an exemplary embodiment of the present disclosure will now be described with reference to accompanying drawings.

Figure 2:
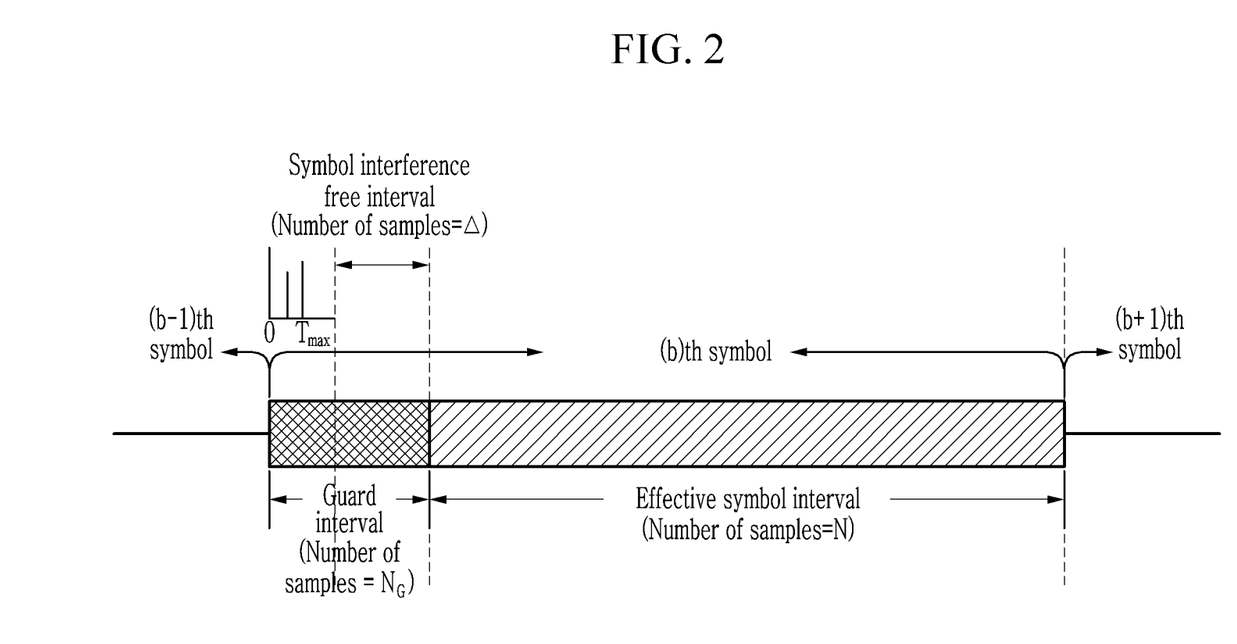
FIG. 2 shows an example of an OFDM symbol for indicating a guard interval without inter-symbol interference according to an exemplary embodiment of the present disclosure.

FIG. 2 shows an example of an OFDM symbol for indicating a guard interval without inter-symbol interference according to an exemplary embodiment of the present disclosure.

Referring to FIG. 2, a random OFDM symbol (referred to as a symbol hereinafter), that is, a (b)-th symbol, includes a guard interval and an effective symbol interval at a front end. Although not shown, the effective symbol interval includes a symbol data interval and a guard interval at a rear end.

Here, "the guard interval without ISI" from among the guard interval at the front end will be referred to as a symbol interference free interval. $\tau_{max}$ represents a maximum delay time of a channel, and is inversely proportional ($\Delta = N_G - \tau_{max}$) to the maximum delay time of the symbol interference free interval.

A configuration of an OFDM receiver for suppressing ICI and additive white Gaussian noise (referred to as AWGN hereinafter) by using the symbol interference free interval before performance of an FFT operation will now be described according to two exemplary embodiments.

Figure 3:
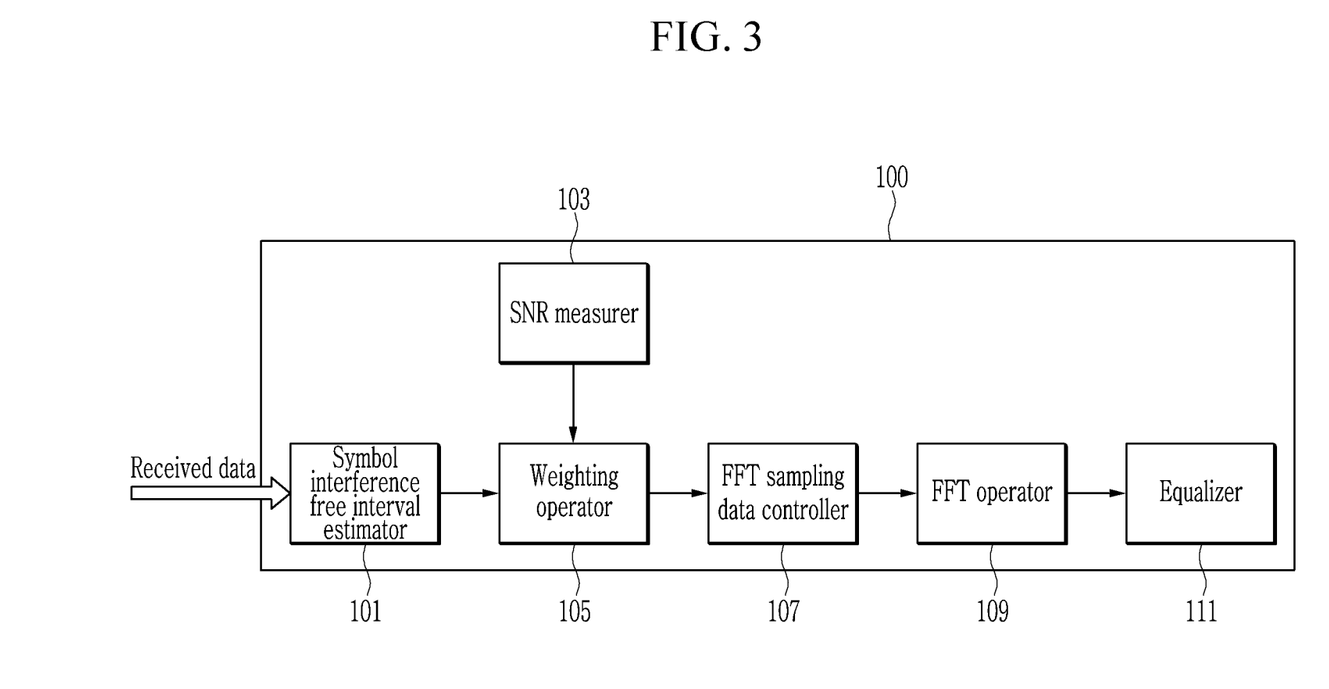
FIG. 3 shows a block diagram for indicating a configuration of an OFDM receiver according to an exemplary embodiment of the present disclosure.

A first exemplary embodiment is to use an actually measured SNR. FIG. 3 shows a block diagram for indicating a configuration of an OFDM receiver according to an exemplary embodiment of the present disclosure, FIG. 4 shows a flowchart of a method for suppressing an inter-carrier interference and noise signal according to an exemplary embodiment of the present disclosure, FIG. 5 shows a drawing for finding correlation energy for estimating a symbol interference free interval according to an exemplary embodiment of the present disclosure, and FIG. 6 shows an example for configuring FFT input data according to an exemplary embodiment of the present disclosure.

Figure 4:
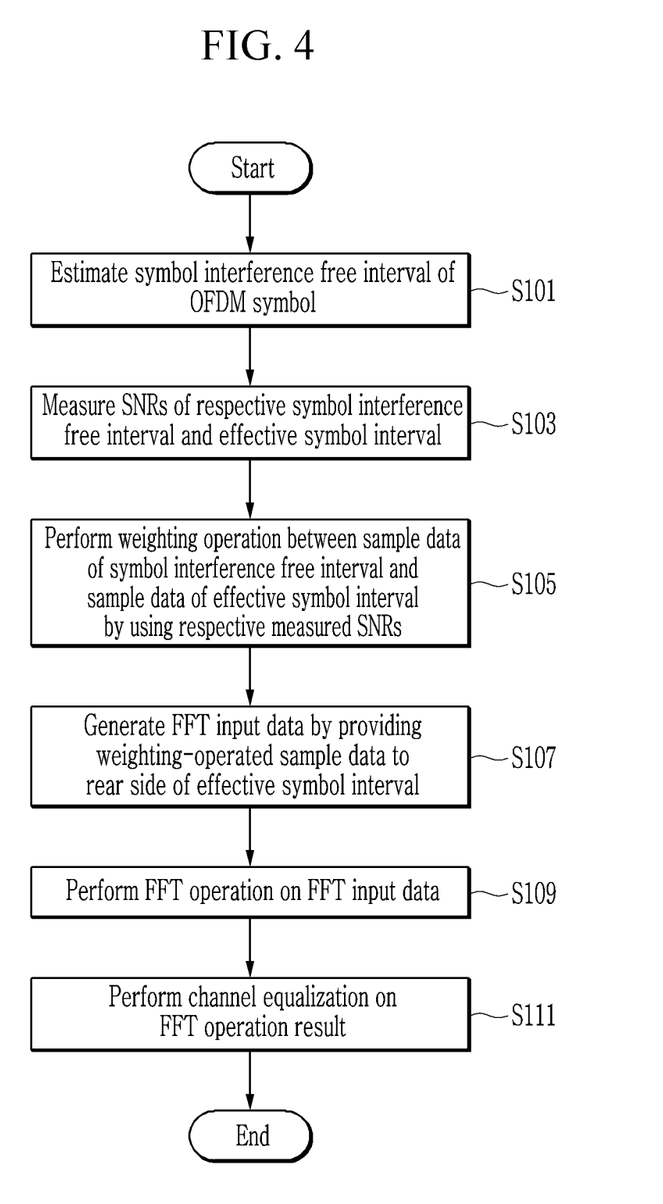
FIG. 4 shows a flowchart of a method for suppressing an inter-carrier interference and noise signal according to an exemplary embodiment of the present disclosure.

Referring to FIG. 3 and FIG. 4, the OFDM receiver 100 includes a symbol interference free interval estimator 101, an SNR measurer 103, a weighting operator 105, an FFT sampling data controller 107, an FFT operator 109, and an equalizer 111.

The symbol interference free interval estimator 101 estimates a symbol interference free interval and a number (−) of samples of the symbol interference free interval by using received data S101.

Figure 5:
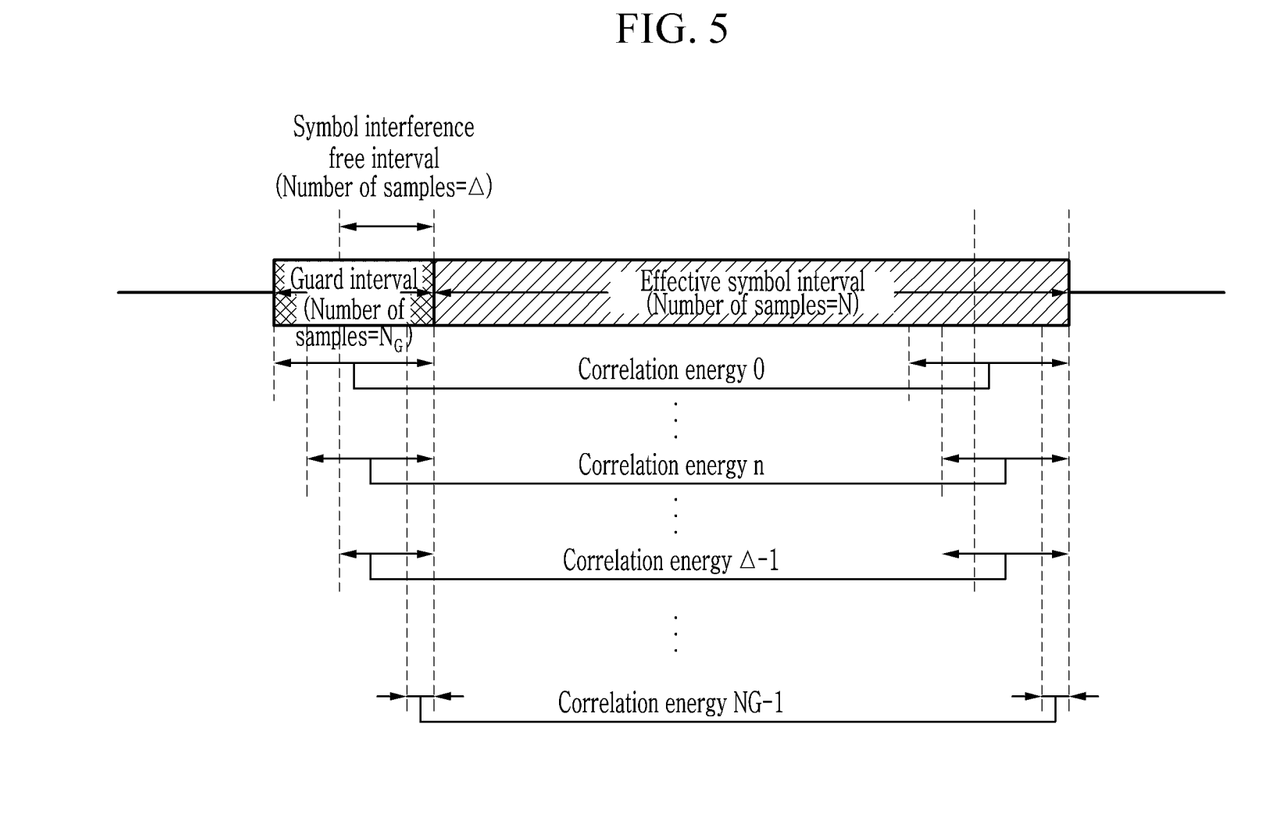
FIG. 5 shows a drawing for finding correlation energy for estimating a symbol interference free interval according to an exemplary embodiment of the present disclosure.
Figure 6:
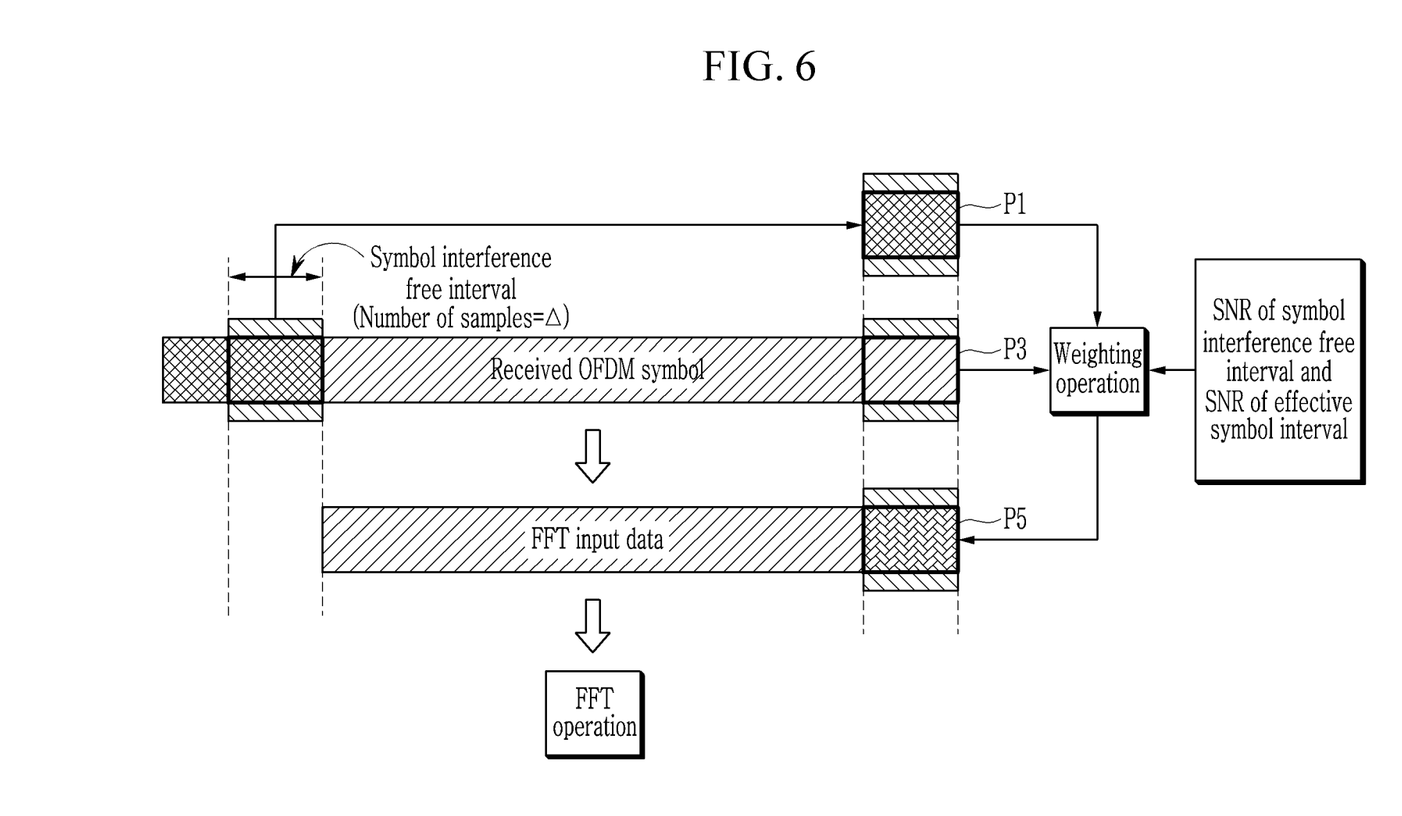
FIG. 6 shows an example for configuring FFT input data according to an exemplary embodiment of the present disclosure.

Here, according to one exemplary embodiment, the symbol interference free interval estimator 101 may use a method using a correlation of the guard interval of the OFDM symbol as shown in FIG. 5.

Referring to FIG. 5, the symbol interference free interval estimator 101 finds correlation energy between the guard interval and the effective symbol interval to find a symbol interference free interval.

The symbol interference free interval estimator 101 calculates the correlation energy while changing the number of samples, so as to find the correlation energy. For example, correlation energy 0 corresponds to the number of samples=$N_G$. When there is a channel impulse response, the correlation energy is operated to be the highest, so the symbol interference free interval estimator 101 uses the correlation energy operated to be the highest to find a symbol interference free interval. That is, when the correlation energy $\Delta-1$ is operated to be the highest, the guard interval where the correlation energy $\Delta-1$ is calculated may be estimated to be a symbol interference free interval. The symbol interference free interval estimator 101 transmits the estimated symbol interference free interval and the number ($\Delta$) of samples of the symbol interference free interval to the FFT sampling data controller 107.

The guard interval is a cyclic prefix (CP) of the effective symbol interval, so transmission data of the guard interval are equivalent to transmission data provided in a final area of the effective symbol interval.

The SNR measurer 103 measures each SNR of the symbol interference free interval and the effective symbol interval (S103). For example, the SNR may be calculated by measuring channel power, but the SNR measuring method may be measured by using a method or a device known to the field of the communication industry, which will not be specifically written and no description thereof will be provided.

The weighting operator 105 performs a weighting operation using the SNRs of the respective intervals between the sample data P1 of the symbol interference free interval and the sample data P3 provided on a rear portion of the corresponding effective symbol interval by using a CP data characteristic (S105). Through the above-noted weighting operation, a differential component and a noise component of a radio channel may be reduced, and the SNR may acquire a gain of a large interval in an environment with a large channel change.

Here, when a received symbol is modeled, it becomes as follows.

$$y[n], 0<n<N+N_G \quad \text{[Equation 1]}$$

Here, n is a time index, N is an effective symbol interval length, $N_G$ is a guard interval length, $\Delta$ is a number of samples on the symbol interference free interval, and y(n) is an output signal of an analog-digital converter (ADC) at an n-th time.

When the symbol interference free interval of the received symbol is modeled, it becomes as follows.

$$y[n-N+N_G], N-\Delta<n<N \quad \text{[Equation 2]}$$

When the effective symbol interval of the received symbol is modeled, it becomes as follows.

$$y[n+N_G], N-\Delta<n<N \quad \text{[Equation 3]}$$

An output (out[n]) of the weighting operator 105 is as follows.

$$out[n] = \frac{1}{SNR_{GI} + SNR_{EF}} \quad \text{[Equation 4]}$$

-continued $$(SNR_{GI} \cdot y[n-N+N_G] + SNR_{EFF} \cdot y[n+N_G])$$

Here, it is given that $N-\Delta \le n \le N$.

In this instance, $SNR_{GI}$ signifies the SNR of the symbol interference free interval, and $SNR_{EFF}$ means the SNR of the effective symbol interval corresponding to the symbol interference free interval.

The weighting operation method may obtain an MRC gain. However, when a difference between $SNR_{GI}$ and $SNR_{EFF}$ is very large, hardware (HW) bit precision for expressing this is increased and a hardware (HW) operation amount may be increased. When the hardware bit precision is insufficient, a size of the output of the weighting operator 105 may be biased.

As described above, when the difference between $SNR_{GI}$ and $SNR_{EFF}$ is very large, that is, when it is greater than a predetermined threshold value, the hardware operation amount is reduced by setting a range for a ratio of $SNR_{GI}$ and $SNR_{EFF}$ with limited hardware bit precision.

$$out[n] = \alpha \cdot y[n-N+N_G] + (1-\alpha) \cdot y[n+N_G], \quad \text{[Equation 5]}$$

$$N - \Delta \le n \le N$$

$$\text{where) } \alpha = \max\left(\frac{1}{2^{bit-1}}, \min\left(1, \frac{SNR_{GI}}{2 \cdot SNR_{EF}}\right)\right)$$

Here, $\alpha$ signifies a range setting value of the hardware bit precision.

The FFT sampling data controller 107 configures FFT input data by providing sample data P5 that are weighting-operated between the sample data P1 of the symbol interference free interval and the sample data P3 provided on a rear side of the corresponding effective symbol interval by the weighting operator 105 to a rear side of the effective symbol interval (S107). The FFT sampling data controller 107 outputs the FFT input data generated by arranging the weighting-operated sample data P5 to the FFT operator 109.

Here, the FFT input data are as follows.

$$FFT_{IN}[n] = \begin{cases} y[n+N_G], & 0 \le n \le N-\Delta \\ out[n], & N-\Delta \le n \le N \end{cases} \quad \text{[Equation 6]}$$

In the case of applying Equation 4 to Equation 6, when the FFT input data are expressed as received data, $SNR_{GI}$ and $SNR_{EFF}$, they are as follows.

$$FFT_{IN}[n] = \begin{cases} y[n+N_G], & 0 \le n \le N-\Delta \\ \frac{1}{SNR_{GI} + SNR_{EFF}}(SNR_{GI} \cdot y[n-N+N_G] + \\ SNR_{EFF} \cdot y[n+N_G]), & N-\Delta \le n \le N \end{cases} \quad \text{[Equation 7]}$$

The FFT operator 109 performs an FFT operation on the FFT input data output by the FFT sampling data controller 120 (S109).

The equalizer 111 performs channel equalization on a signal output by the FFT operator 109 (S111).

As described above, a gain that is similar to the MRC diversity may be acquired by using the SNRs of the symbol interference free interval and the effective symbol interval and performing a weighting operation on the respective sample data in an environment in which the change of channel is large.

Figure 7:
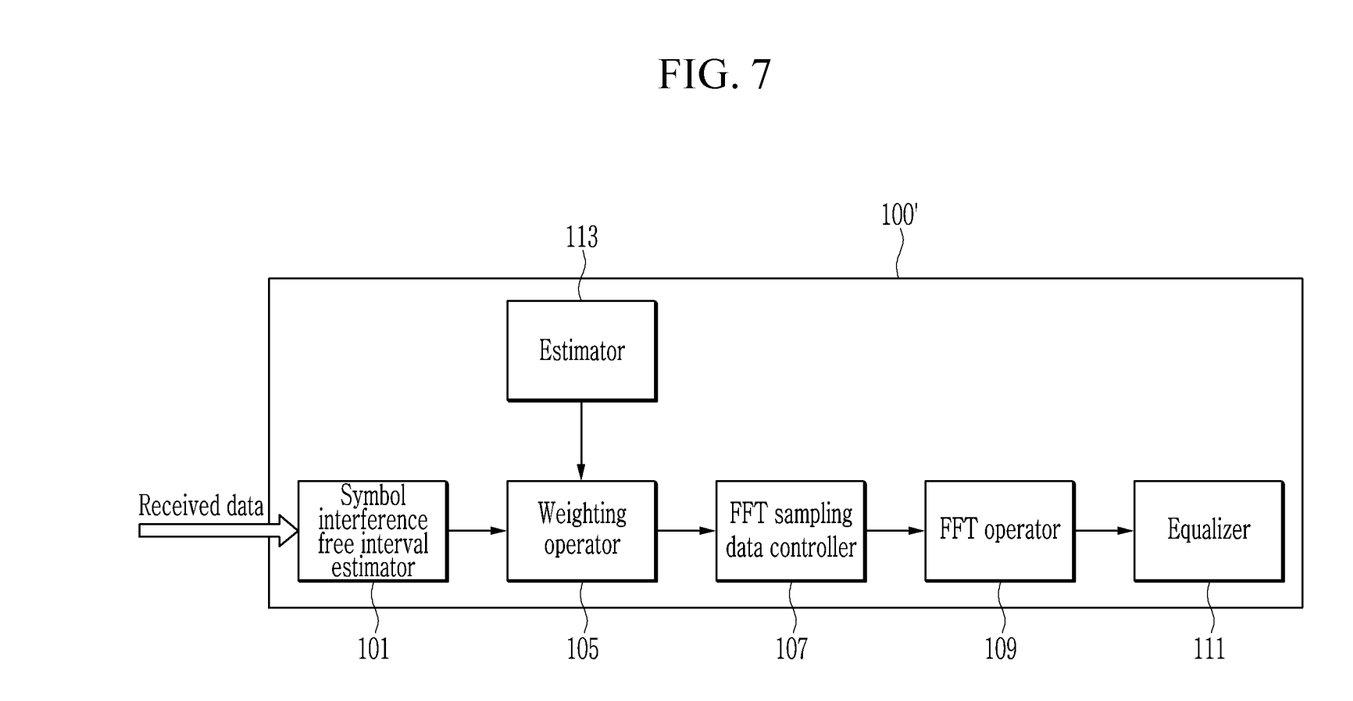
FIG. 7 shows a block diagram for indicating a configuration of an OFDM receiver according to another exemplary embodiment of the present disclosure.
Figure 8:
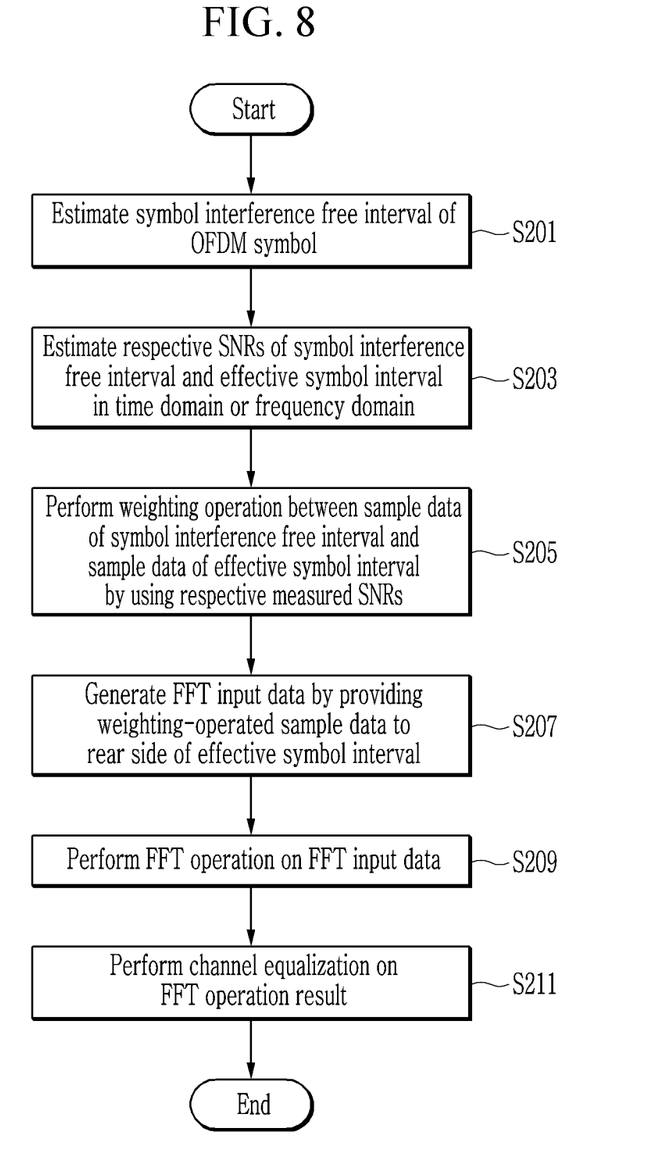
FIG. 8 shows a flowchart of a method for suppressing an inter-carrier interference and noise signal according to another exemplary embodiment of the present disclosure.
Figure 9:
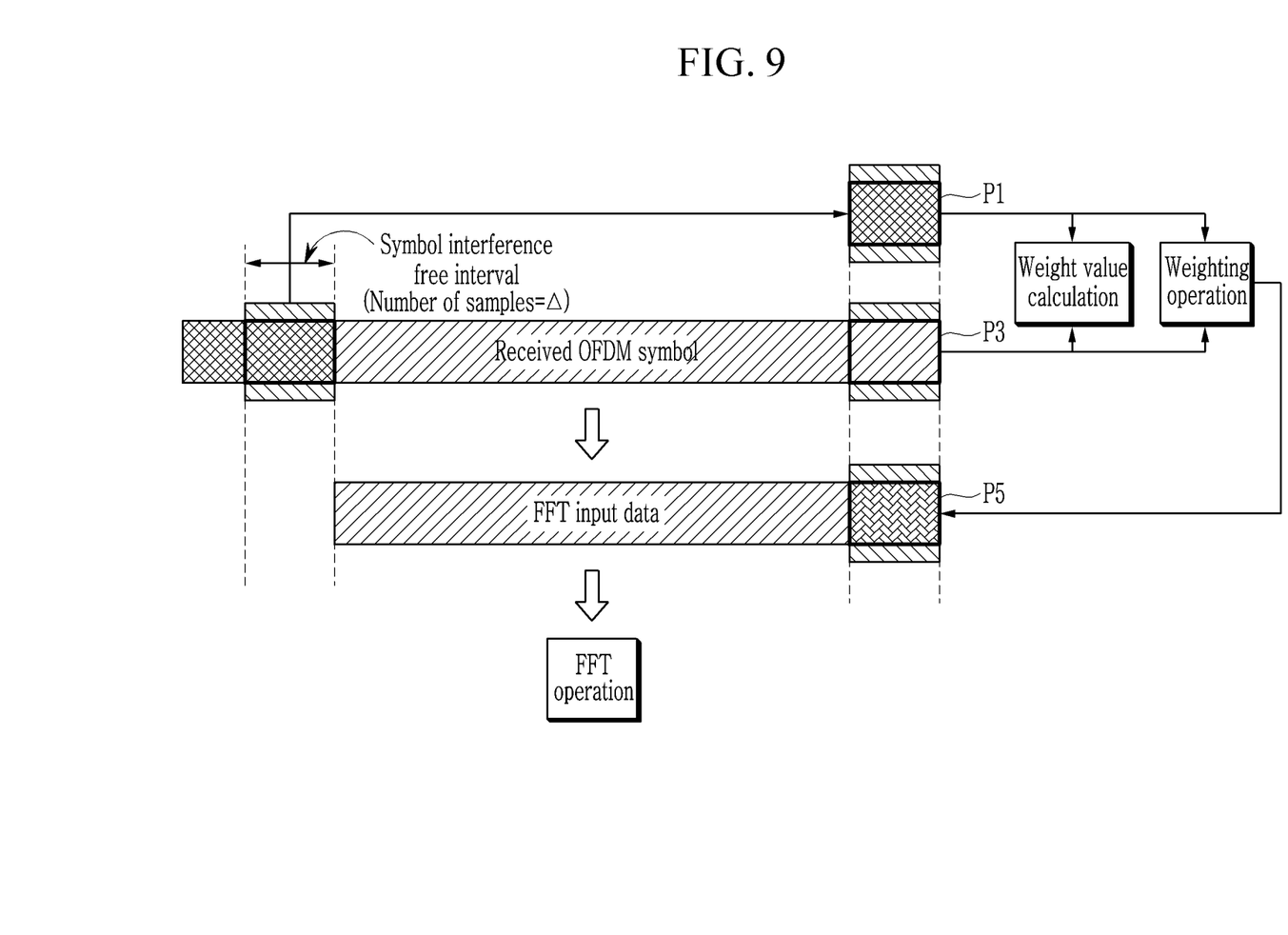
FIG. 9 shows an example for configuring FFT input data according to another exemplary embodiment of the present disclosure.
Figure 10:
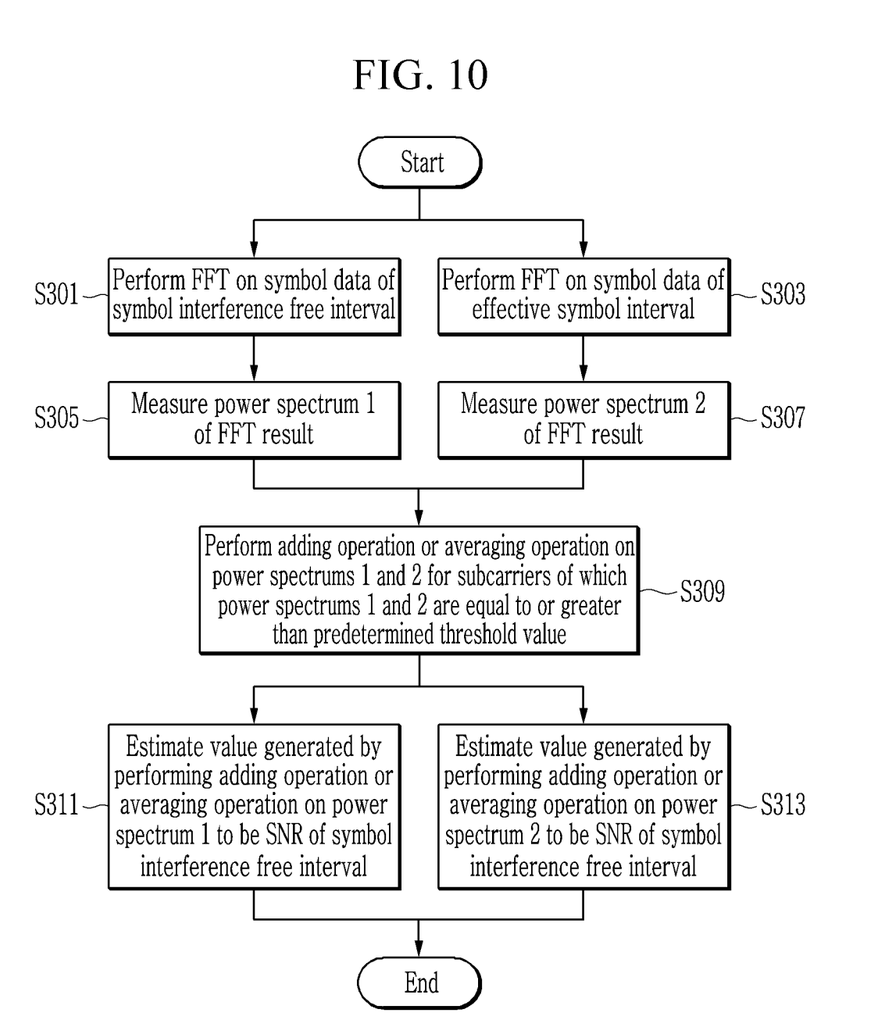
FIG. 10 shows a flowchart of a method for estimating an SNR according to an exemplary embodiment of the present disclosure.

Further, another exemplary embodiment is a method for estimating the SNR in an actual environment, and FIG. 7 shows a block diagram for indicating a configuration of an OFDM receiver according to another exemplary embodiment of the present disclosure, FIG. 8 shows a flowchart of a method for suppressing an inter-carrier interference and noise signal according to another exemplary embodiment of the present disclosure, FIG. 9 shows a flowchart of a method for estimating an SNR according to an exemplary embodiment of the present disclosure, and FIG. 10 shows an example for configuring FFT input data according to another exemplary embodiment of the present disclosure.

In this instance, constituent elements that are the same as those in the configuration shown with reference to FIG. 3 will use same reference numerals, and operations that are the same as those shown with reference to FIG. 3 will not be described.

Referring to FIG. 7, the OFDM receiver 100' includes a symbol interference free interval estimator 101, a weighting operator 105, an FFT sampling data controller 107, an FFT operator 109, an equalizer 111, and an estimator 113.

Referring to FIG. 8, the symbol interference free interval estimator 101 estimates a symbol interference free interval from an OFDM symbol of received data (S201). The stage S201 corresponds to the stage S101 of FIG. 4.

The estimator 113 estimates an SNR of the symbol interference free interval and an SNR of the effective symbol interval (S203).

The weighting operator 105 performs a weighting operation between the sample data of the symbol interference free interval and the sample data of the effective symbol interval by using the SNR estimated by the estimator 113 (S205). The stage S205 corresponds to the stage S105 of FIG. 4.

As shown in FIG. 9, the FFT sampling data controller 107 provides the weighting-operated sample data P5 to the rear side of the effective symbol interval to configure FFT input data (S207). The stage S207 corresponds to the stage S107 of FIG. 4. However, a calculation of a weight value used to the weighting operation is performed by the estimator 113, which will be described in a latter portion of the present specification.

The FFT operator 109 performs an FFT operation on the FFT input data generated by arranging the weighting-operated sample data P5 (S209). The stage S209 corresponds to the stage S109 of FIG. 4.

The equalizer 111 performs channel equalization on the FFT operation result (S211). The stage S211 corresponds to the stage S111 of FIG. 4.

Here, according to an exemplary embodiment, the estimator 113 estimates an SNR in the time domain. Noise with respect to time does not change much, so it may be assumed that the sample data of the symbol interference free interval and the sample data of the corresponding effective symbol interval may have similar noise. Therefore, power of the time domain data may correspond to the SNR.

Hence, the estimator 113 may indirectly estimate $SNR_{GI}$ and $SNR_{EFF}$ as follows.

$$SNR_{GI} = \sum_{n=\Delta}^{N_G} |y[n]|^2 \quad \text{[Equation 8]}$$

-continued $$SNR_{EFF} = \sum_{n=N+N_G-\Delta}^{N+N_G} |y[n]|^2 \quad \text{[Equation 9]}$$

In this instance, to simplify the hardware (HW), a size component, not power, may be used. Here, the size component signifies a summation of absolute values. A summation of signal squaring components is performed in the case of using power, but the squaring operation is not performed in the case of using the size component, so it is possible to use a lesser number of hardware bits compared to the use of power, and no process for a squaring operation is needed.

Further, to reduce the hardware bit precision, an average may be taken with the number (–) of samples of the symbol interference free interval or a random scale reduction may be performed.

According to another exemplary embodiment, the estimator 113 estimates an SNR in a frequency domain. In a multi-channel environment or a condition where different kinds of noise are provided, a carrier-to-noise ratio (referred to as CNR hereinafter) on the frequency basis between the sample data of the symbol interference free interval and the sample data of the effective symbol interval is inconsistent. Therefore, when a method for indirectly estimating the SNR on the frequency is applied, it is expressed as shown in FIG. 10.

Referring to FIG. 10, the estimator 113 performs an FFT corresponding to the length of the guard interval (GI) on the sample data of the symbol interference free interval and the sample data of the effective symbol interval, respectively (S301) and (S303).

Power spectrum 1 of the FFT result on the sample data of the symbol interference free interval and power spectrum 2 of the FFT result on the sample data of the effective symbol interval are found (S305) and (S307).

The estimator 113 performs an adding operation (addition) or an averaging operation on the respective power spectrums of subcarriers of which the power spectrums of the FFT result on the sample data of the symbol interference free interval and the FFT result on the sample data of the effective symbol interval are equal to or greater than a predetermined threshold value (S309). Values of the adding-operated or averaging-operated power spectrums are estimated to be $SNR_{GI}$ and $SNR_{EFF}$ (S311).

That is, the estimator 113 estimates the value generated by performing an adding operation or an averaging operation on the power spectrum 1 to be $SNR_{GI}$, and the value generated by performing an adding operation or an averaging operation on the power spectrum 2 to be $SNR_{EFF}$ for the respective subcarriers of which the power spectrums 1 and 2 are equal to or greater than a threshold value.

Here, the subcarrier of which the power spectrum is equal to or less than a predetermined threshold value is a subcarrier with a low CNR, it has low reliability, so the subcarrier with a high CNR is used.

The weighting operator 105, as described above, performs a weighting operation in a like manner of Equation 4 or Equation 5 by using the $SNR_{GI}$ and the $SNR_{EFF}$ estimated by the estimator 113.

The above-described embodiments can be realized through a program for realizing functions corresponding to the configuration of the embodiments or a recording medium for recording the program in addition to through the above-described device and/or method.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

The invention claimed is:

1. A method for an orthogonal frequency division multiplex (OFDM) receiver to suppress an inter-carrier interference and noise signal by using a symbol interference free interval without inter-symbol interference (ISI) in a guard interval (GI), comprising the steps of:
   performing a weighting operation between sample data of the symbol interference free interval and sample data of an effective symbol interval by using a signal-to-noise ratio (SNR) of the symbol interference free interval and an SNR of the effective symbol interval corresponding to the symbol interference free interval; and
   performing a Fast Fourier Transform (FFT) on an input data including the weighting-operated sample data into the effective symbol interval.

2. The method of claim 1, further comprising,
   before the weighting operation, measuring or estimating SNR of the symbol interference free interval and SNR of the effective symbol interval, respectively, wherein the weighting operation includes using the measured or estimated SNR of the symbol interference free interval and SNR of the effective symbol interval.

3. The method of claim 2, wherein the measuring or estimating includes estimating SNR of the symbol interference free interval and SNR of the effective symbol interval respectively through power of received data in a time domain.

4. The method of claim 2, wherein the measuring or estimating includes:
   performing FFT corresponding to a length of GI on the sample data of the symbol interference free interval and the sample data of the effective symbol interval;
   measuring a first power spectrum of FFT result on the sample data of the symbol interference free interval and a second power spectrum of FFT result on the sample data of the effective symbol interval; and
   estimating a value generated by performing an adding operation or an averaging operation on the first power spectrum to be a SNR of the symbol interference free interval and a value generated by performing an adding operation or an averaging operation on the second power spectrum to be SNR of the effective symbol interval for at least one subcarrier of which the first power spectrum and the second power spectrum are equal to or greater than a predetermined threshold value.

5. The method of claim 1, wherein the weighting operation set a range value with hardware bit precision using SNR of the symbol interference free interval and SNR of the effective symbol interval.

6. An orthogonal frequency division multiplexing (OFDM) receiver comprising:
   a weighting operator configured to perform a weighting operation between sample data of a symbol interference free interval without inter-symbol interference (ISI) in a guard interval (GI) of an OFDM symbol and sample data of an effective symbol interval corresponding to the symbol interference free interval by using a signalto-noise ratio (SNR) of the symbol interference free interval without ISI and SNR of the effective symbol interval;

a Fast Fourier Transform (FFT) sampling data controller configured to perform generating input data by including weighting-operated sample data into the effective symbol interval; and a FFT operator configured to perform a FFT operation on the input data.

7. The OFDM receiver of claim 6, wherein the weighting operator performs the weighting operation using a first operation value generated by applying a weight coefficient to a signal modeled as the symbol interference free interval, a second operation value generated by applying a weight coefficient to a signal modeled as the effective symbol interval, and a value generated by summing SNR of the symbol interference free interval and SNR of the effective symbol interval, wherein the weight coefficient of the first operation value is SNR of the symbol interference free interval, the weight coefficient of the effective symbol interval is SNR of the effective symbol interval.

8. The OFDM receiver of claim 6, wherein the weighting operator calculates a range setting value with hardware bit precision by using SNR of the symbol interference free interval and SNR of the effective symbol interval, and applies the range setting value as each weight coefficient to a signal modeled as the symbol interference free interval and a signal modeled as the effective symbol interval, to perform a weighting operation.

9. The OFDM receiver of claim 6, further comprising:

a measurer configured to measure SNR of the symbol interference free interval and SNR of the effective symbol interval corresponding to the symbol interference free interval; or an estimator configured to estimate SNR of the symbol interference free interval and SNR of the effective symbol interval corresponding to the symbol interference free interval in a time domain or a frequency domain.

10. The OFDM receiver of claim 9, wherein the estimator estimates an adding-operated or averaging-operated first power spectrum for at least one subcarrier as SNR of the symbol interference free interval, and an adding-operated or averaging-operated second power spectrum for at least one subcarrier as SNR of the effective symbol interval, wherein the first power spectrum is a spectrum of FFT results for the sample data of the symbol interference free interval, the second power spectrum is a spectrum of FFT results for the sample data of the effective symbol interval, the at least one subcarrier is in which the first power spectrum and the second spectrum are equal to or greater than a threshold value.

* * * * *